United States Patent
Casas et al.

(10) Patent No.: US 10,162,166 B2
(45) Date of Patent: Dec. 25, 2018

(54) MICRODISSECTION VIEWING SYSTEM

(71) Applicant: MikroScan Technologies, Inc., Carlsbad, CA (US)

(72) Inventors: Victor Casas, Vista, CA (US); James Crowe, Oceanside, CA (US)

(73) Assignee: MIKROSCAN TECHNOLOGIES, INC., Carlsbad, CA (US)

( * ) Notice: Subject to any disclaimer, the term of this patent is extended or adjusted under 35 U.S.C. 154(b) by 499 days.

(21) Appl. No.: 14/925,905

(22) Filed: Oct. 28, 2015

(65) Prior Publication Data
US 2016/0116729 A1    Apr. 28, 2016

Related U.S. Application Data

(60) Provisional application No. 62/069,719, filed on Oct. 28, 2014.

(51) Int. Cl.
*G06K 9/00* (2006.01)
*G02B 21/36* (2006.01)
*G02B 21/00* (2006.01)
*G01N 1/00* (2006.01)

(52) U.S. Cl.
CPC ....... *G02B 21/368* (2013.01); *G02B 21/0072* (2013.01); *G02B 21/362* (2013.01); *G02B 21/365* (2013.01)

(58) Field of Classification Search
USPC ....... 382/100, 103, 106, 128–134, 162, 168, 382/173, 181, 189, 203, 209, 219, 224, 382/232, 254–276, 286–291, 305, 312, 382/321; 356/36, 237.1, 369; 355/67; 435/6.13
See application file for complete search history.

(56) References Cited

U.S. PATENT DOCUMENTS 4,700,298 A    10/1987  Palcic et al.
5,018,029 A    5/1991   Ekhoff et al.
5,216,500 A    6/1993   Krummey et al.
(Continued)

FOREIGN PATENT DOCUMENTS

CN    101430272 A    5/2009
CN    102035834 B    6/2013
(Continued)

OTHER PUBLICATIONS

Battmann et al. Telemedicine: Application of Telephathology-Remote miscroscopy for intraoperative diagnoses on frozen sections. Telemedicine pp. 1127-1130 (2000).
(Continued)

*Primary Examiner* — Seyed Azarian
(74) *Attorney, Agent, or Firm* — Wilson Sonsini Goodrich & Rosati (57) ABSTRACT

The present disclosure provides devices, systems and methods for the acquisition and display of captured and/or saved slide images of a sample. In particular embodiments, the images are displayed on a portable computer attached to a removable device configured to hold a slide of the sample. The device is aligned with the portable computer so that the displayed sample image is overlaid with the sample being held by the device. In exemplary embodiments, the displayed image is used as a template for dissection of the sample being held by the device.

8 Claims, 3 Drawing Sheets

(56) References Cited

U.S. PATENT DOCUMENTS

| | | | |
|---|---|---|---|
| 5,216,596 A | 6/1993 | Weinstein | |
| 5,297,034 A | 3/1994 | Weinstein | |
| 5,333,052 A | 7/1994 | Finarov | |
| 5,432,871 A | 7/1995 | Novik | |
| 5,450,201 A * | 9/1995 | Katzir | G01N 21/8806 356/369 |
| 5,828,500 A * | 10/1998 | Kida | G01M 11/02 359/798 |
| 6,020,966 A * | 2/2000 | Ausschnitt | G01B 11/028 356/237.1 |
| 6,101,265 A | 8/2000 | Bacus et al. | |
| 6,208,374 B1 | 3/2001 | Clinch | |
| 6,272,235 B1 | 8/2001 | Bacus et al. | |
| 6,400,395 B1 | 6/2002 | Hoover et al. | |
| 6,452,625 B1 | 9/2002 | Kapitza | |
| 6,606,413 B1 | 8/2003 | Zeineh | |
| 6,674,881 B2 | 1/2004 | Bacus et al. | |
| 6,711,283 B1 | 3/2004 | Soenksen | |
| 6,847,729 B1 | 1/2005 | Clinch et al. | |
| 6,905,300 B1 | 6/2005 | Russum | |
| 7,028,075 B2 | 4/2006 | Morris | |
| 7,035,478 B2 | 4/2006 | Crandall et al. | |
| 7,116,437 B2 | 10/2006 | Weinstein et al. | |
| 7,116,440 B2 | 10/2006 | Eichhorn et al. | |
| 7,149,332 B2 | 12/2006 | Bacus et al. | |
| 7,215,467 B2 | 5/2007 | Nakagawa | |
| 7,224,839 B2 | 5/2007 | Zeineh | |
| 7,257,268 B2 | 8/2007 | Eichhorn et al. | |
| 7,292,251 B1 | 11/2007 | Gu et al. | |
| 7,319,540 B2 | 1/2008 | Tipirneni | |
| 7,391,894 B2 | 6/2008 | Zeineh | |
| 7,432,486 B2 | 10/2008 | Tanemura et al. | |
| 7,502,519 B2 | 3/2009 | Eichhorn et al. | |
| 7,518,652 B2 | 4/2009 | Olson et al. | |
| 7,542,596 B2 | 6/2009 | Bacus et al. | |
| 7,602,524 B2 | 10/2009 | Eichhorn et al. | |
| 7,646,495 B2 | 1/2010 | Olsen et al. | |
| 7,668,362 B2 | 2/2010 | Olson et al. | |
| 7,738,688 B2 | 6/2010 | Eichhorn et al. | |
| 7,755,841 B2 | 7/2010 | Christenson et al. | |
| 7,801,352 B2 | 9/2010 | Uchiyama et al. | |
| 7,826,649 B2 | 11/2010 | Crandall et al. | |
| 7,844,125 B2 | 11/2010 | Eichhorn et al. | |
| 7,856,131 B2 | 12/2010 | Bacus et al. | |
| 7,893,988 B2 | 2/2011 | Olson et al. | |
| RE42,220 E | 3/2011 | Clinch et al. | |
| 7,916,916 B2 | 3/2011 | Zeineh | |
| 7,941,275 B2 | 5/2011 | Gholap et al. | |
| 7,949,168 B2 | 5/2011 | Crandall et al. | |
| 7,979,212 B2 | 7/2011 | Gholap et al. | |
| 8,010,555 B2 | 8/2011 | Eichhorn | |
| 8,023,714 B2 | 9/2011 | Soenksen | |
| 8,086,077 B2 | 12/2011 | Eichhorn | |
| 8,094,902 B2 | 1/2012 | Crandall et al. | |
| 8,103,082 B2 | 1/2012 | Olson et al. | |
| 8,126,250 B2 | 2/2012 | Cooke et al. | |
| 8,189,897 B2 | 5/2012 | Leidenbach | |
| 8,200,767 B2 | 6/2012 | Ariga | |
| 8,325,150 B1 | 12/2012 | Reeves et al. | |
| 8,456,522 B2 | 6/2013 | Olson et al. | |
| 8,515,683 B2 | 8/2013 | Gholap et al. | |
| 8,781,261 B2 | 7/2014 | Eichhorn | |
| 8,805,791 B2 | 8/2014 | Eichhorn | |
| 8,996,570 B2 | 3/2015 | Stratman et al. | |
| 2002/0061127 A1 | 5/2002 | Bacus et al. | |
| 2002/0091548 A1 | 7/2002 | Auer et al. | |
| 2003/0123717 A1 | 7/2003 | Bacus et al. | |
| 2004/0066960 A1 | 4/2004 | McLaren et al. | |
| 2004/0085443 A1 | 5/2004 | Kallioniemi et al. | |
| 2004/0136582 A1 | 7/2004 | Bacus et al. | |
| 2005/0134687 A1 | 6/2005 | Kaminsky et al. | |
| 2006/0023201 A1 * | 2/2006 | Malekafzali | G01N 1/2813 356/36 |
| 2006/0104499 A1 | 5/2006 | Zahniser et al. | |
| 2006/0159367 A1 | 7/2006 | Zeineh et al. | |
| 2007/0103739 A1 | 5/2007 | Anderson, Jr. et al. | |
| 2007/0279735 A1 | 12/2007 | Sieckmann | |
| 2009/0028414 A1 | 1/2009 | Crandall et al. | |
| 2009/0076368 A1 | 3/2009 | Balas | |
| 2009/0098534 A1 * | 4/2009 | Weier | C12Q 1/6841 435/6.13 |
| 2009/0238435 A1 | 9/2009 | Shields | |
| 2009/0272186 A1 | 11/2009 | Hall | |
| 2010/0020299 A1 * | 1/2010 | Zebala | G03B 27/54 355/67 |
| 2010/0067759 A1 | 3/2010 | Zeineh | |
| 2010/0103253 A1 | 4/2010 | Sieckmann et al. | |
| 2010/0194681 A1 | 8/2010 | Halushka | |
| 2010/0315502 A1 | 12/2010 | Tafas et al. | |
| 2011/0048142 A1 | 3/2011 | Pfeifer | |
| 2011/0090327 A1 | 4/2011 | Kenny et al. | |
| 2011/0217238 A1 | 9/2011 | Borrebaeck et al. | |
| 2011/0311123 A1 | 12/2011 | Gholap et al. | |
| 2012/0011151 A1 | 1/2012 | Eichhorn | |
| 2012/0038979 A1 | 2/2012 | Hing et al. | |
| 2012/0072452 A1 | 3/2012 | Stratman et al. | |
| 2012/0099769 A1 | 4/2012 | Eichhorn | |
| 2013/0182922 A1 | 7/2013 | Kil | |
| 2013/0265576 A1 | 10/2013 | Acher | |
| 2014/0098209 A1 | 4/2014 | Neff | |
| 2014/0193839 A1 | 7/2014 | Cunningham | |
| 2014/0333959 A1 | 11/2014 | Casas | |
| 2016/0299057 A1 | 10/2016 | Casas | |

FOREIGN PATENT DOCUMENTS

| | | |
|---|---|---|
| WO | WO-9930264 A1 | 6/1999 |
| WO | WO-02073246 A2 | 9/2002 |
| WO | WO-2008028944 A1 | 3/2008 |
| WO | WO-2013013117 A1 | 1/2013 |
| WO | WO-2015073897 A2 | 5/2015 |
| WO | WO-2016069794 A1 | 5/2016 |
| WO | WO-2017066635 A1 | 4/2017 |

OTHER PUBLICATIONS

Co-pending U.S. Appl. No. 14/848235, filed Sep. 8, 2015.
Co-pending U.S. Appl. No. 14/853,763, filed Sep. 14, 2015.
PCT/US2012/047527 International Preliminary Report on Patentability dated Jan. 21, 2014.
PCT/US2012/047527 International Search Report dated Oct. 1, 2012.
U.S. Appl. No. 14/234,013 office Action dated Jan. 30, 2015.
U.S. Appl. No. 14/848,235 Office Action dated Oct. 29, 2015.
Parvin et al. DeepView: A Channel for Distributed Microscopy and Informatics. Supercomputing, ACM/IEEE 1999 Conference, Nov. 13-18, 1999 (15 pgs).
PCT/US2015/057890 International Search Report and Written Opinion dated Feb. 5, 2016.
U.S. Appl. No. 14/853,763 Office Action dated Dec. 3, 2015.
U.S. Appl. No. 14/853,763 Office Action dated May 16, 2016.
Co-pending U.S. Appl. No. 15/294,541, filed Oct. 14, 2016.
PCT/US2014/065806 International Preliminary Report on Patentability dated May 26, 2016.
PCT/US2014/065806 International Search Report and Written Opinion dated Feb. 19, 2015.
U.S. Appl. No. 14/848,235 Office Action dated Aug. 9, 2016.
U.S. Appl. No. 14/848,235 Office Action dated Nov. 3, 2016.
Co-pending U.S. Appl. No. 15/351,889, filed Mov. 15, 2016.
PCT/US2016/057137 Invitation to Pay Additional Fees dated Dec. 27, 2016.
PCT/US2016/057137 International Search Report and Written Opinion dated Mar. 3, 2017.
PCT/US2015/057890 International Preliminary Report on Patentability dated May 11, 2017.
U.S. Appl. No. 14/848,235 Office Action dated Mar. 21, 2017.
U.S. Appl. No. 15/351,889 Office Action dated Mar. 24, 2017.
Fueten. A computer-controlled rotating polarizer stage for the petrographic microscope. Computers & Geosciences 23(2):203-208 (1997).

(56) References Cited

OTHER PUBLICATIONS

U.S. Appl. No. 14/848,235 Office Action dated Jun. 30, 2017.
U.S. Appl. No. 15/036,501 Office Action dated Aug. 24, 2017.
U.S. Appl. No. 15/036,501 Office Action dated Dec. 28, 2017.

* cited by examiner

MICRODISSECTION VIEWING SYSTEM

CROSS-REFERENCE

This application claims the benefit of U.S. Provisional Application No. 62/069,719, filed Oct. 28, 2014, which is incorporated herein in its entirety.

BACKGROUND OF THE INVENTION

Microscopy is an important tool useful in a variety of clinical (e.g., pathology) and scientific applications including microbiology, plant tissue culture, animal cell culture, molecular biology, immunology and cell biology. Increasingly important is the acquisition and use of digital images of microscope samples, which may be displayed on a display screen to a local or remote location for analysis. Selections of analyzed samples are often further processed, for example by dissection, for further analysis, such as identification by polymerase chain reaction (PCR).

SUMMARY OF THE INVENTION

Provided herein are devices, methods and systems for specimen microdissection. In various aspects, a microdissection method comprises acquiring and displaying an image of a first sample of specimen, wherein the image is annotated by a user, e.g., a pathologist. The annotated image is displayed on a screen of a portable computer attached to a device for microdissection, wherein the device comprises a receiving region for holding a second sample of the specimen. The device is positioned over the screen so that the second sample is overlaid with the annotated image of the first sample. In many embodiments, the annotated image provides a template for the dissection of the second sample. In additional embodiments, the dissected second sample is further analyzed using polymerase chain reaction (PCR).

In one aspect, provided herein is a microdissection device configured to reversibly attach to a portable computer comprising a screen, the device comprising a frame and a receiving region for receiving a sample of a specimen for microdissection, wherein the device at least partially covers the screen of the portable computer. In some embodiments, the receiving region is a slide receiving region comprising an opening flanked by a rim, wherein the rim provides a seat for a slide comprising the sample. In some embodiments, the receiving region comprises a window of transparent material. In some embodiments, the receiving region is depressed within the frame. In some embodiments, the frame comprises a retainer for attaching the device to the portable computer. In some embodiments, the retainer comprises a first attachment wrap located along a first end of the device and a second attachment wrap located along a second end of the device, wherein each attachment wrap is configured to wrap along distal ends of the portable computer. In some embodiments, each attachment wrap comprises an inward projection. In some embodiments, the frame is movable along an axis of the portable computer. In some embodiments, the frame comprises plastic, silicon, rubber, woven textile, metal, or a combination thereof. In some embodiments, the receiving region has a first dimension of 0.5 to 2 inches and a second dimension of 1 to 5 inches.

In some embodiments, the microdissection device is part of a system comprising a non-transitory computer-readable storage media encoded with a computer program including instructions executable by a processor of the portable computer to create an application for displaying an image of a second sample of the specimen, the application comprising a software module receiving image data of the second sample; a software module receiving annotation data corresponding to the image data of the second sample; and a software module generating an annotated display image of the second sample from the image data and annotation data; wherein the annotation data indicates an area of interest of the specimen for microdissection.

In one aspect, provided herein is a microdissection system, comprising: (a) a portable computer comprising a processor, a memory and a screen, the processor configured to receive image data of a first sample, and present the image data as a display image on the screen of the portable computer; and (b) a device comprising a frame, a retainer, and a receiving region for receiving a second sample; wherein the second sample is for microdissection; wherein the device is removably attachable to the portable computer by the retainer; and wherein the device is configured to slide with respect to the computer screen. In some embodiments, the processor retrieves the image data from a database. In some embodiments, the processor receives annotation data corresponding to the image data of the first sample. In some embodiments, the receiving region is a slide receiving region comprising an opening flanked by a rim, wherein the rim provides a seat for a slide comprising the sample. In some embodiments, the receiving region comprises a window of transparent material. In some embodiments, the receiving region is depressed within the frame. In some embodiments, the retainer comprises a first attachment wrap located along a first end of the device and a second attachment wrap located along a second end of the device, wherein each attachment wrap is configured to wrap along distal ends of the portable computer. In some embodiments, each attachment wrap comprises an inward projection. In some embodiments, the frame is movable along an axis of the portable computer. In some embodiments, the frame comprises plastic, silicon, rubber, woven textile, metal, or a combination thereof.

In one aspect, provided herein is a microdissection method comprising: (a) providing to an imaging device a first sample of a specimen comprising an area of interest for microdissection; (b) acquiring image data from a scan of the first sample; (c) storing the image data from the scan on a database; (d) retrieving on a portable computer stored image data from the area of interest of the first sample, wherein the retrieved image data is presented on a screen of the portable computer as a display image; (e) placing a second sample of the specimen comprising the area of interest for microdissection on a sleeve positioned over the screen of the portable computer; (f) overlaying the area of interest for microdissection of the second sample with the display image of the first sample; and (g) dissecting the area of interest of the second sample using the display image of the first area of interest of the first sample as a template. In some embodiments, the first sample of the specimen is stained with a dye and the second sample of the specimen is not stained with a dye. In some embodiments, the first sample and the second sample are different samples corresponding to the same region of the specimen. In some embodiments, the scan is obtained at a resolution between about 10× and about 100×. In some embodiments, acquiring image data from a scan of the first sample comprises advancing a field of view of an objective lens of the imaging device stepwise across the first sample while acquiring successive images of each field of view. In some embodiments, the image of the first sample displayed on the screen of the portable computer is essentially the same size as the first sample. In some embodiments, the method further comprises retrieving on the portable computer stored image data from the area of interest of the first sample and presenting the stored image data on the screen of the portable computer as a magnified display image, wherein the magnified display image is at least 1.5× the size of the actual area of interest of the first sample.

In some embodiments, the method further comprises transferring the image data from the scan to a viewing terminal for display to a user on a monitor, wherein the user views the display of the image data and defines the area of interest for microdissection with an annotation. In some embodiments, the annotation comprises drawing a circle or a box around the area of interest using a binary overlay or other computerized annotation tool. In some embodiments, the annotation is stored with the image data on the database, and wherein the stored annotation is retrieved with the image data by the portable computer.

In some embodiments, the scan of the first sample is obtained at a high resolution, and the method comprises: digitally processing the high resolution image data to obtain data for a low resolution copy of an image of the first sample, or acquiring low resolution image data of the first sample from a scan of the first sample at a low resolution. In some embodiments, the method further comprises displaying an image of the first sample from the low resolution image data copy or the acquired low resolution image data on a monitor of a viewing terminal. In some embodiments, the method further comprises selecting of an area of the image of the first sample displayed on the monitor of the viewing terminal, wherein selection of said area prompts the transfer of corresponding high resolution image data of the area to the viewing terminal for display on a monitor. In some embodiments, a user views the image of the first sample displayed on the monitor of the viewing terminal and annotates the area of interest for microdissection on the low resolution image copy or the acquired low resolution image, the high resolution image, or both; and wherein the annotation is stored on the database and retrieved on the portable computer. In some embodiments, digitally processing comprises digital image compression. In some embodiments, digitally processing comprises removing peripheral shading around each image.

In one aspect, provided herein is a non-transitory computer readable storage media encoded with a computer program including instructions executable by a processor of a portable computer to create an application for presenting information regarding a microdissection method, the application comprising a software module receiving pressure information corresponding to a user applying pressure to a screen of the portable computer during microdissection, a software module receiving image data of a sample and annotation data corresponding to the image data, a software module comparing the pressure information to the annotation data, and a software module generating an output on the screen of the portable computer, the output comprising information on the accuracy of the microdissection method as calculated by the comparison.

BRIEF DESCRIPTION OF THE DRAWINGS

The novel features of the invention are set forth with particularity in the appended claims. It will be appreciated that the figures (and features therein) are not necessarily drawn to scale.

A better understanding of the features and advantages of the present invention will be obtained by reference to the following detailed description that sets forth illustrative embodiments, in which the principles of the invention are utilized, and the accompanying drawings or figures, of which.

DETAILED DESCRIPTION OF THE INVENTION

While various embodiments have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments described herein may be employed. It shall be understood that different aspects of the embodiments can be appreciated individually, collectively, or in combination with each other.

The present disclosure provides devices, systems and methods for dissecting a sample of a specimen using an image of the specimen as a template. In some embodiments, a device for microdissection is configured to reversibly attach to a portable computer comprising a screen, wherein the screen displays the template image of the specimen. In some embodiments, a microdissection device disclosed herein comprises: a frame comprising a retainer for attaching the device to a portable computer, and a receiving region for receiving a sample for microdissection.

In some embodiments, an exemplary microdissection method comprises: attaching a microdissection device to a portable computer comprising a screen; providing to a receiving region of the device a specimen sample for microdissection; moving the microdissection device along an axis of the portable computer to align the specimen sample for microdissection with an image of the specimen displayed on the screen of the portable computer; and using the image of the specimen as a template, dissecting the specimen sample. A dissected sample may then be further processed or characterized using additional diagnostic techniques, including but not limited to molecular biology techniques. For example, techniques for the detection and optional quantification of a biomolecule, such as a nucleic acid, protein, lipid, carbohydrate or small molecule. Non-limiting examples of molecular biology techniques include polymerase chain reaction (PCR), including quantitative PCR, reverse transcription PCR, real-time PCR and multiplex PCR; DNA and RNA microarrays, in situ hybridization, DNA sequencing, antibody based immunoassays, and the like. These techniques are useful for cancer diagnostics, identification of infectious diseases, and the analysis of identified bacterial genes for antimicrobial resistance.

In one aspect, provided herein is a microdissection viewing system comprising a device for microdissection, and a non-transitory computer readable storage media encoded with a computer program including instructions executable by a processor of a portable computer comprising a screen to create an application for displaying an image of a sample of a specimen, the application comprising: (a) a software module receiving image data of the sample; (b) a software module receiving annotation data corresponding to the image data of the sample; and (c) a software module generating an annotated display image of the sample from the image data and annotation data; wherein the annotation data indicates an area of interest of the specimen for microdissection. In some embodiments, a microdissection viewing system comprises a device for microdissection, and a non-transitory computer readable storage media encoded with a computer program including instructions executable by a processor of a portable computer to create an application for presenting information regarding a microdissection method, the application comprising: (a) a software module receiving pressure information corresponding to a user applying pressure to a screen of the portable computer during microdissection, (b) a software module receiving image data of a sample and annotation data corresponding to image data of the sample, wherein the annotation data defines an area for microdissection, (c) a software module comparing the pressure information to the annotation data, and (d) a software module generating an output on the screen of the portable computer, the output comprising information on the accuracy of the microdissection method as calculated by the comparison. In some embodiments, the output is a second annotated image of the sample, wherein the second annotation comprises the annotation data defining the area for microdissection and data outlining the actual area of microdissection as identified by the pressure information. In some embodiments, a device for microdissection comprises: a frame comprising a retainer for attaching the device to a portable computer, and a receiving region for receiving a sample for microdissection.

In one aspect, provided herein are systems for microdissection comprising a microdissection device; a non-transitory computer readable storage media; an imaging device; a computer network; a portable computer comprising a screen; and any combination thereof. In exemplary embodiments, a microdissection system comprises a portable computer and a microdissection device, wherein the portable computer displays an image of a specimen and the device holds a sample of the specimen for dissection using the image as a template. A dissected sample may then be further processed or characterized using molecular biology techniques, such as polymerase chain reaction (PCR). In some cases, a microdissection system comprises an imaging device that acquires image data of a specimen. In some cases, a microdissection system comprises a computer network comprising a processor for annotating image data of a specimen acquired with an imaging device, wherein the annotated image data is displayed as an annotated image on a screen of a portable computer.

In another aspect, provided herein are methods of microdissection comprising: acquiring image data of a specimen using an image acquisition system, displaying an image of the specimen from the image data on a screen of a portable computer, and using the display image as a template for dissecting a sample of the specimen. In an exemplary embodiment, the image acquisition system comprises an imaging device that acquires a plurality of high resolution images of a specimen. The plurality of images, in exemplary implementations, are reassembled to create a single image of the specimen, which is then processed to a low resolution copy of the single image. In exemplary embodiments, the low resolution copy of the image, which is optionally stored in a database, is displayed on a screen of a viewing terminal as a navigation map. In additional embodiments, the navigation map is annotated and the annotated image is displayed on a screen of a portable computer. In some embodiments, the portable computer is attached to a microdissection device comprising a receiving region holding a sample of the specimen, wherein the displayed annotated image is overlaid with the receiving region so that the sample of the specimen is aligned with the displayed annotated image. In additional embodiments, the methods include the dissection of the sample using the displayed annotated image as a template. The method, in various embodiments, further comprises processing the dissected sample by PCR.

A specimen, or sample thereof, includes, without limitation, biological samples which are traditionally viewed using microscopy in fields such as pathology, surgical pathology, surgery, veterinary medicine, education, life science research, anatomic pathology, cytology and cytopathology. In some embodiments, a specimen is a tissue sample. The specimens may be whole, cross-sections or any portion of a whole specimen.

Microdissection using the methods provided herein enable oncology researchers to compare the molecular profiles (e.g., by PCR) of tumor tissue to surrounding non-tumor tissue. The researchers may use a digitized, scanned image as a guide from a pathologist to select the area of a tissue having a tumor for dissection. The pathologist may be located remotely from the person performing the dissection.

Microdissection Device

In one aspect, provided herein is a microdissection device comprising a frame and a receiving region for receiving a sample of a specimen for microdissection. In some embodiments, the microdissection device comprises a retainer for reversibly attaching the device to a portable computer. In some cases, the retainer is configured so that once the device is attached to the portable computer, the device is movable along an axis of the portable computer. A retainer may comprise an attachment wrap located at a first end and optionally a second end of the device, wherein each attachment wrap comprises an inward projection so that the attachment wrap wraps around an end of a portable computer. In some cases, a retainer is a continuous component of the frame. In some cases, a retainer is a separate and optionally removable component of the frame. In some embodiments, the frame is a sleeve and the device is retained on the portable computer by sliding the sleeve over an axis of the portable computer. In some cases, a device is held onto a portable computer by friction between the device and the portable computer. In some cases, a device is reversibly held onto the portable computer by a clasp, suction, hook-and-loop fastener (e.g., VELCRO®), and/or adhesive.

Figure 1:
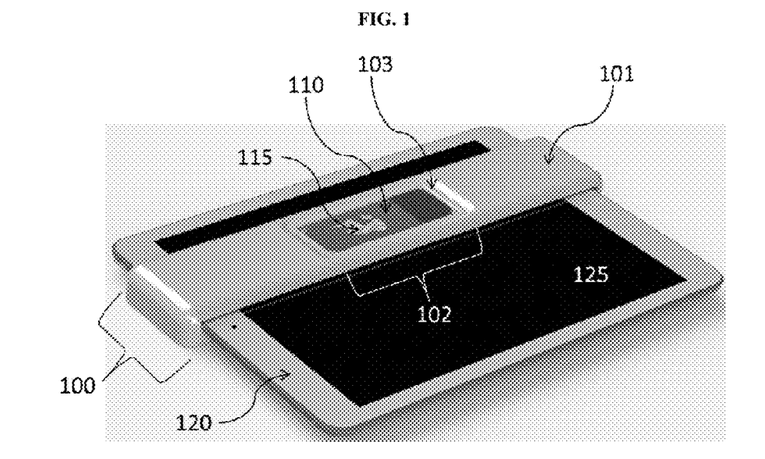
FIG. 1 illustrates a non-limiting example of a device for microdissection attached to a portable computer.

In various embodiments, a microdissection device comprising a frame and a receiving region as described herein is configured to attach to a portable computer comprising a screen. The microdissection device may be attached to any body of the portable computer in any configuration which allows for the receiving region of the device to overlay at least a portion of the portable computer screen. In some cases, a microdissection device is attached to a body surround the screen of the portable computer. For example, as shown in FIG. 1, device 100 is attached to a portable computer at a body 120. In some cases, a microdissection device is attached to the screen of the portable computer. In some preferred embodiments, a microdissection device attaches to a first end and a second end of a body of a portable computer, wherein the body of the computer surrounds a screen. In some preferred embodiments, the device comprises a first attachment wrap for attaching to the first end of the body of the portable computer and a second attachment wrap for attaching to the second end of the body of the portable computer, wherein the first and second attachment wraps are continuous components of the device frame. In some additional preferred embodiments, the first and second attachment wraps are held onto the body of the portable computer with friction.

The microdissection device frame may be comprised of any material capable of maintaining structural integrity of the receiving region while a sample held by the receiving region is dissected. In some cases, the material is structurally capable of maintaining attachment of the device to a portable computer comprising a screen. In some embodiments, the material is rigid, and the length of the device is a fixed length configured to attach to a portable computer of a specific length. For example, the length of the device is fixed to the length of a cellular phone, a tablet (e.g., iPad®), or a laptop. In some embodiments, the material is flexible, and the length of the device is adjustable to the length of a portable computer. For example, the device comprises an elastic material. In some embodiments, the device is adjustable to a longer or shorter length by sliding an extender of the device out from, or into, respectively, a sleeve of the device. Suitable device materials include, without limitation, plastic, silicon, rubber, vinyl, elastic, fabric, metal, and any combination thereof. In some preferred embodiments, the device comprises a plastic material.

In some embodiments, a receiving region and a frame of a microdissection device comprise a same material. In some embodiments, a receiving region and a frame of a microdissection device are a single unit. In some embodiments, a receiving region and a frame of a microdissection device are different components of a device, wherein the receiving region is optionally removable from the frame. For instance, the receiving region is a disposable portion of a device and the frame is a non-disposable and re-usable portion of the device, wherein a receiving region is disposed of after a microdissection is performed on the region. In some preferred embodiments, a microdissection device comprises a frame and a receiving region as a single unit.

In some embodiments, a receiving region of a microdissection device is configured to receive a slide comprising a sample of a specimen for dissection. In some instances, the receiving region comprises an opening flanked by a rim, wherein the rim provides a seat for a slide. In some cases, the device comprises one or more prongs for holding the slide on the device. In some cases, the receiving region is recessed in the frame. In some cases, the receiving region provides a seat for a slide having a first dimension of 0.5 to 2 inches and a second dimension of 1 to 5 inches. For example, the receiving region provides a seat for a 1 inch by 3 inch slide, with a tolerance of 0.5, 0.2, 0.1, 0.05, or 0.03 inches. Exemplary rim materials include, without limitation, plastic, silicon, rubber, and metal. In some preferred embodiments, the exemplary material is plastic. In some preferred embodiments, a microdissection device comprises a frame and a receiving region as a single unit, wherein the receiving unit comprises an opening flanked by a rim.

In some embodiments, a receiving region of a microdissection device is configured to receive a sample of a specimen for dissection, wherein the sample is optionally presented on a slide. In some instances, the receiving region comprises a window of transparent material. For example, the window comprises glass or plastic. In some cases, the receiving region is recessed in the frame.

In some embodiments, a receiving region of a microdissection device is movable along an X and/or Y axis of a device. In this manner, when the device is attached to a portable computer, a user can move the receiving region along an X and/or Y axis to align the receiving region with an image of a specimen displayed on a screen of the portable computer. As an example, in some cases a device is not movable along an axis of a portable computer to which it is attached, and therefore a sample held on the receiving region is only movable with respect to the computer by moving the receiving region. In some preferred embodiments, a receiving region of a microdissection device is fixed within the device, wherein the receiving region is movable with the device in one X axis or Y axis.

In some embodiments, the microdissection device at least partially covers a screen of a portable computer when attached to the portable computer. In some cases, the device covers from about 10% to about 100% of the surface of the screen, or about 10%-90%, 10%-80%, 10%-70%, 10%-60%, or 10%-50% of the screen surface. In some embodiments, the receiving region is about 0.5 to about 2 inches in one dimension, and about 1 to about 5 inches in another dimension. In some embodiments, the receiving region is recessed within the frame by about 0.03 to about 0.5 inches.

An exemplary device for microdissection is shown attached to a portable computer comprising a screen in FIG. 1. Device 100 comprises a frame 101 and a receiving region 102. The frame 101 is attached to a body of a portable computer 120 surrounding a screen 125. The receiving region 102 comprises a rim 103 that provides a seat for slide 110. Slide 110 comprises a sample of a specimen 115. The sample of the specimen 115 is aligned with an image of the specimen displayed on screen 125 of the portable computer (image not shown). The image of the specimen serves as a template for the microdissection of specimen 115.

Figure 2:
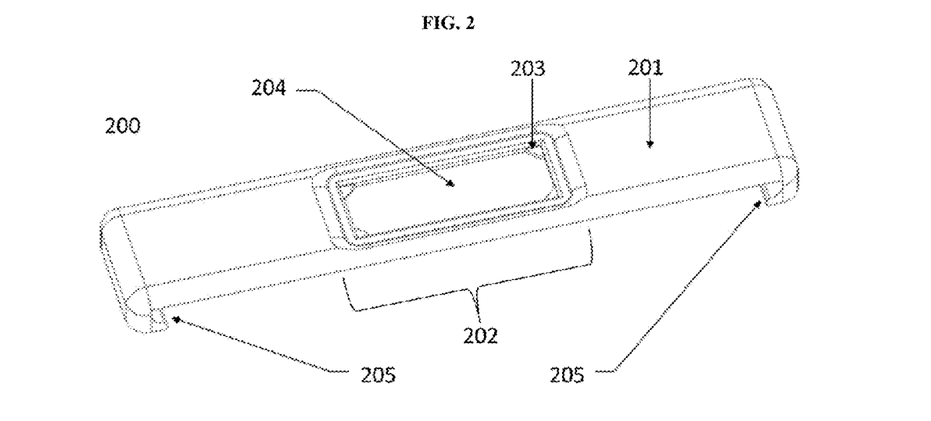
FIG. 2 illustrates a non-limiting example of a device for microdissection comprising a receiving region, and a frame comprising a retainer for attaching the device to a portable computer.

Another exemplary device for microdissection is shown in FIG. 2. Device 200 comprises a frame 201 and a receiving region 202. Frame 201 comprises attachment wings 205 as retainers to retain the device to a portable computer. Receiving region 202 comprises an opening 204 flanked by a rim 203, wherein the rim 203 provides a seat for a slide (slide not shown).

In one aspect, provided herein is a system comprising a microdissection device configured for attachment to a portable computer during microdissection, and a screen protector to cover a screen of the computer during microdissection. The screen material may comprise a flexible or rigid material. In some cases, the screen protector comprises a transparent material, for example, plastic or glass. In some cases, the screen protector comprises an adhesive. In some embodiments, the screen protector is configured to overlay a portion of a portable computer screen (e.g., the portion of the screen covered by an attached microdissection device) or the entire screen of the computer.

Image Acquisition and Processing Systems

In one aspect, provided herein are systems for the acquisition and optional processing of image data of a specimen, wherein the image data is received by a portable computer to display an image of the specimen. The displayed image of the specimen is useful as a template for microdissection of a sample of the specimen overlaid on the displayed image in a microdissection device. In some embodiments, an image acquisition system is utilized for whole slide imaging (WSI), sometimes referred to as virtual microscopy, which involves the digitization or scanning of slides to produce digital images for viewing, and/or manual image analysis, automated image analysis, or a combination thereof.

Provided herein, in various aspects, is an image acquisition system comprising an imaging device for acquiring an image of a sample. In some embodiments, the imaging device comprises a microscope. In some instances, the microscope comprises a slide holder for holding a sample optionally provided on a slide. In some instances, the microscope comprises a light source. In some instances, the microscope comprises an optical component, such as an objective lens, a condenser or a light shaping diffuser. In some instances, the microscope comprises a lens changing device. In some instances, the image acquisition system comprises a digital acquisition device. In some embodiments, an imaging device is a slide scanner optionally configured for whole slide imaging.

Figure 3:
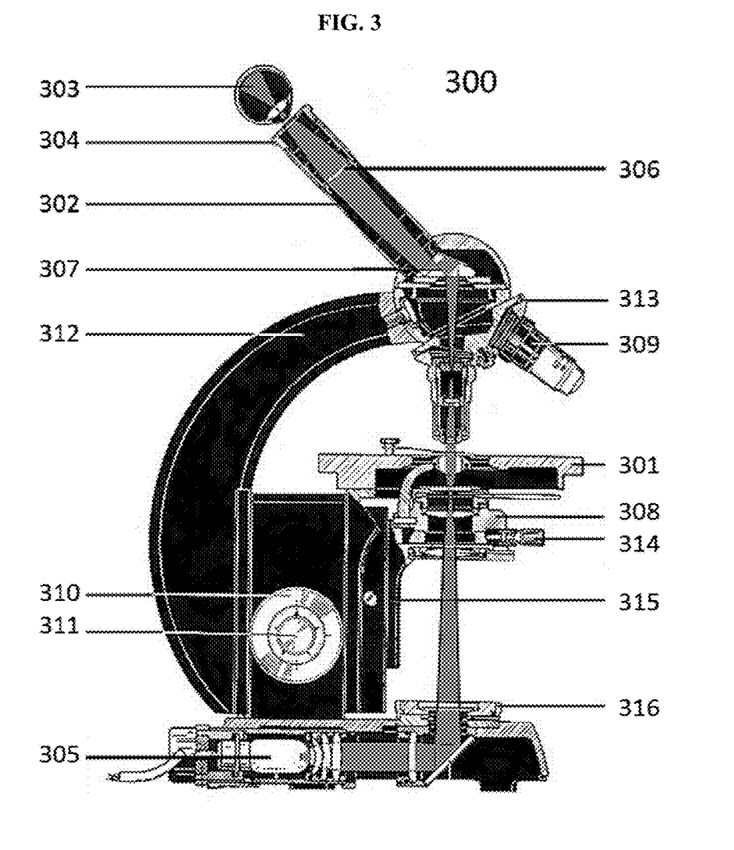
FIG. 3 shows a non-limiting example of a microscope of an imaging device described herein.

An exemplary microscope of an imaging device is shown in FIG. 3. Microscope 300 comprises a slide holder 301 configured to hold a sample that is viewed through tube 302 via an eye 303 and eyepiece 304. The sample is illuminated for viewing using a halogen bulb 305 as a light source. Microscope 300 comprises the following optical components: lens 306, prism 307, and condenser 308. The sample is viewed through one or more objectives 309. The view of the sample is focused using a coarse focus 310 and a fine focus 311. Microscope 300 further comprises an arm 312, nosepiece 313, aperture diaphragm 314, condenser focus 315, and field diaphragm 316. The microscope is optionally connected to a digital acquisition device for acquiring image data of the sample.

In various embodiments, an imaging device is configured to acquire one or more images of a sample, wherein the sample is optionally provided to the device on a slide. In some implementations, the imaging device is able to scan a plurality of slides (e.g., 1-20, 1-10, 1-5) at a time. In some embodiments, the imaging device acquires one or more images of a sample, wherein the one or more images of the sample are saved to a database and/or displayed, and wherein the images displayed can be saved images, live images or both saved and live images of the sample. In some instances, the acquired images are high resolution images which are processed into a low resolution copy of image data. Low resolution copy image data may be saved to a database and/or displayed. In some cases, a display is viewed on a monitor at a viewing terminal. In some instances, a viewing terminal and imaging device are located at the same location. In other embodiments, a viewing terminal is located remotely from the imaging device at a remote terminal. A live image, in many instances, refers to an image of a sample present in the imaging device at the same time the image is being displayed, allowing for real-time control of the display of the sample.

In some embodiments, an imaging device comprises a microscope, wherein the microscope comprises a slide holder for holding a sample. In some embodiments, the slide holder is movable, wherein the position of the slide holder is controlled manually or automatically, sometimes with the use of a software program.

In some embodiments, an imaging device comprises a microscope, wherein the microscope comprises a light source. A light source includes, without limitation, a light-emitting diode (LED) array or a halogen bulb. In some instances, the system comprises a mirror which reflects light from an external source to the sample. In cases wherein the light source is a LED array, an acquisition system comprises the LED array and a light shaping diffuser.

In some embodiments, an imaging device comprises a microscope, wherein the microscope comprises one or more optical components. In some embodiments, an optical component is a condenser. The condenser, in many implementations, receives and concentrates light from a light source and transmits said concentrated light to/through a sample. In some embodiments, an optical component is an objective lens. The objective lens, in many implementations, acquires light transmitted through the sample and projects said light to a sensing device. In many implementations, the system comprises a plurality of objective lenses, wherein at least two of the plurality of objective lenses have different optical powers. For example, a system comprises a 4×, 10×, 20×, 40× or 100× objective lens, or a combination thereof. In some embodiments, a view of the sample is focused by moving the objective lens relative to the sample. In some embodiments, a microscope comprises a lens changing device, wherein the lens changing device may be motorized. In some instances, the lens changing device is manually or automatically controlled with the use of a software program. A lens changing device includes, without limitation, a turret. In some embodiments, a view of a sample is focused by moving only a slide holder of a microscope in a Z-axis, wherein the optical components remain stationary.

In some embodiments, an objective lens is a high powered objective lens suitable to obtain a single scan of an entire sample presented to a microscope at high magnification and/or high resolution. A high powered objective lens includes, without limitation, a lens having 20×, 40× or higher magnification. High resolution includes, without limitation, imaging data having 0.3, 0.4, 0.5, 0.6, 0.7 or higher microns per pixel. In an exemplary embodiment, high resolution includes imaging data having 0.51 microns per pixel or higher. In some embodiments, an imaging device acquires a continuous sequence of successive images by advancing a field of view of a high powered objective lens stepwise across an entire sample. In many instances, high resolution image data obtained is processed to generate data for a relatively low resolution copy of the high resolution image data. In some embodiments, the high resolution image data and the low resolution copy of the image data are saved in a database. In other embodiments, an imaging device optically captures low resolution data from a low magnification image of a sample. The low resolution data is optionally stored in a database and/or displayed.

In some embodiments, an image acquisition system comprises a digital acquisition device. In some embodiments, the digital acquisition device is a camera. In some embodiments, the camera is a low magnification camera. Examples of an acquisition device include, without limitation, a CCD and linear array. In some cases, the image acquisition system comprises an imaging device operably connected to a digital acquisition device.

In various aspects, any system components described herein comprise and/or are operably connected to a database. In some cases, the database is stored in a storage device. In some embodiments, the storage device is a removable component, for example, a universal serial bus (USB) drive or compact disk. In other or additional embodiments, the database is stored a cloud-based storage system.

In various embodiments, any system or component thereof described herein comprises and/or are operably connected to a computer network. In some instances, the computer network comprises one or more computers operably connected to an imaging device, wherein operably connected may be wireless or physical. In many implementations, the computer network comprises a plurality of computers and/or devices which are connected by physical or wireless means. A computer of the network may be located remotely from the imaging device. In some instances, the computer network comprises one or more acquisition computers for controlling the acquisition of an image of a sample. In exemplary embodiments, the computer network is configured to control the acquisition, processing and/or display of an image of a sample, wherein the image may be saved and/or live. In some instances, the network comprises one or more displays for viewing an acquired image, either saved, live or both. In some embodiments, one or more of the displays is a component of a viewing terminal of the network. A viewing terminal may be located remotely from the imaging device. A computer, in various implementations, comprises software. In some embodiments, the computer network comprises the internet. In some embodiments, the computer network comprises a web browser.

In some embodiments, provided herein is software for microdissection executable on a portable computer described herein. In one embodiment, a software program controls the acquisition of one or more images of a sample. In one embodiment, the software comprises an image processing means whereby high resolution image data is processed into a low resolution copy of image data. The software may also control the annotation of a processed or unprocessed image of a sample. In some embodiments, software program is provided on a plurality of computers and/or devices of the system. In some embodiments, a software program is provided on a web browser of the system.

In some embodiments, a software program is useful for controlling the operation of an imaging device. This includes, without limitation, the acquisition of an image of a sample and/or the manipulation of a view of the sample. Manipulation of an image view includes, without limitation, focusing a view of a sample (e.g., by changing the position of an objective lens relative to the sample), changing the magnification (e.g., by changing an objective lens), and zooming and/or panning around a saved or live image. In some embodiments, software is used to control the position of a slide holder, in most cases to change the sample field of view. In embodiments, software is used to change an objective lens of an imaging device to a different objective lens. In some embodiments, software is used to move the position of an objective lens relative to a sample to provide automatic or user controlled image focusing. In some embodiments, software automatically detects a region of a slide comprising the sample, and acquires one or more images so that image(s) of the entire sample are acquired.

In some embodiments, a software program is used to reassemble one or more acquired images into a single image, wherein the single image may be an image of an entire sample or an image of a desired area of the sample. In some embodiments, the software is used to sharpen the display of a stored or live image, either automatically or as directed by a user. In some embodiments, software is used to process an image, for example, by removing peripheral shading around an image in a field of view. In additional embodiments, software is used to analyze and/or annotate an acquired image, either automatically or as directed by a user.

In exemplary embodiments, an imaging device acquires high resolution image data which is processed using a software program to a low resolution copy of the image data. The low resolution copy may be saved for viewing at any time. In additional embodiments, software is used to provide a view of said low resolution copy of the image data on a display. The low resolution copy, in various implementations, is useful as a navigation map. The software allows a user to annotate the image, e.g., by selecting an area of the map of interest. For example, an area of interest is circled on the navigation map and the software saves the annotated image on to a database and/or displays the annotated image on a portable computer. In one embodiment, the image is annotated to select an area comprising a tumor or other area of interest for dissection and/or further study.

Microdissection and Imaging Methods

In one aspect, provided herein is a microdissection method comprising: (a) providing to an imaging device a first sample of a specimen comprising an area of interest for microdissection; (b) acquiring image data from a scan of the first sample; (c) storing the image data from the scan on a database; (d) retrieving on a portable computer stored image data from the area of interest of the first sample, wherein the retrieved image data is presented on a screen of the portable computer as a display image; (e) placing a second sample of the specimen comprising the area of interest for microdissection on a sleeve positioned over the screen of the portable computer; (f) overlaying the area of interest for microdissection of the second sample with the display image of the first sample; and (g) dissecting the area of interest of the second sample using the display image of the first area of interest of the first sample as a template. In some embodiments, the first sample of the specimen is stained with a dye and the second sample of the specimen is not stained with a dye. In some embodiments, the first sample and the second sample are different samples corresponding to the same region of the specimen. In some embodiments, the scan is obtained at a resolution between about 10× and about 100×. In some embodiments, acquiring image data from a scan of the first sample comprises advancing a field of view of an objective lens of the imaging device stepwise across the first sample while acquiring successive images of each field of view. In some embodiments, the image of the first sample displayed on the screen of the portable computer is essentially the same size as the first sample. In some embodiments, a microdissection method further comprises retrieving on the portable computer stored image data from the area of interest of the first sample and presenting the stored image data on the screen of the portable computer as a magnified display image, wherein the magnified display image is at least 1.5× the size of the actual area of interest of the first sample.

In some embodiments, a microdissection method comprises transferring image data from a scan to a viewing terminal for display to a user on a monitor, wherein the user views the display of the image data and defines the area of interest for microdissection with an annotation. In some embodiments, the annotation comprises drawing a circle or a box around the area of interest using a binary overlay or other computerized annotation tool. In some embodiments, the annotation is stored with the image data on a database, and wherein the stored annotation is retrieved with the image data by a portable computer.

Figure 4A:
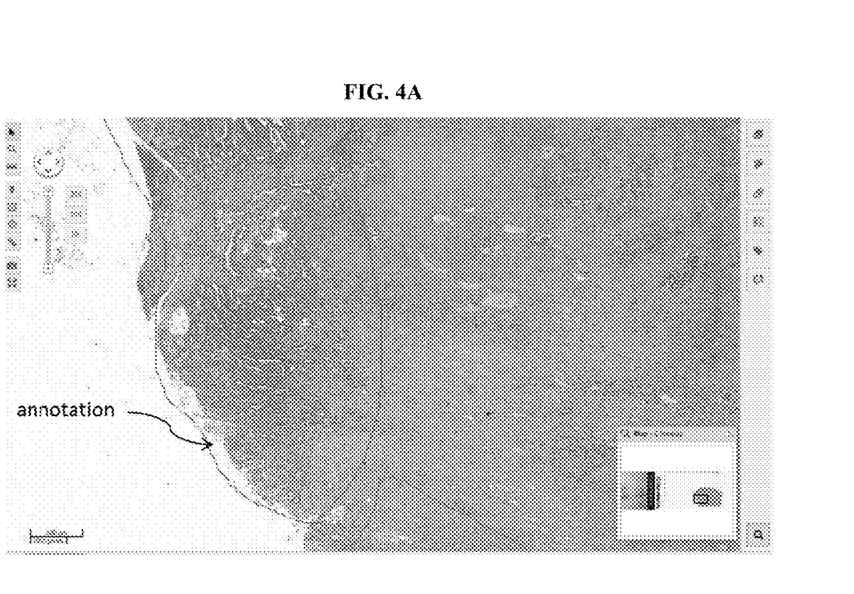
FIG. 4A shows a screen shot of an annotated high resolution image of a specimen sample displayed on a viewing terminal.
Figure 4B:
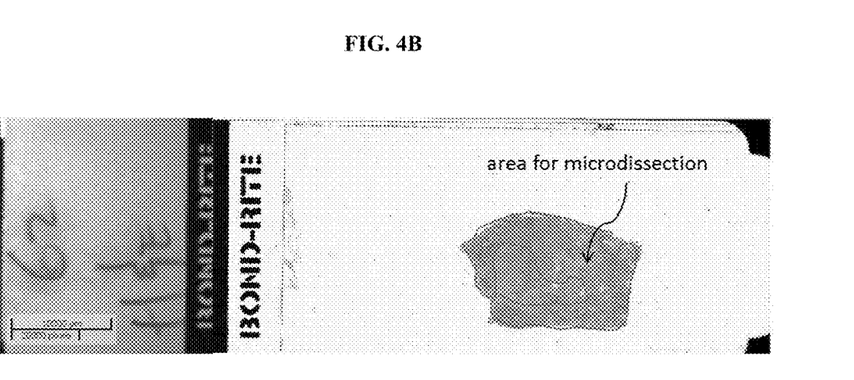
FIG. 4B shows a corresponding low resolution image of the specimen sample displayed in FIG. 4A. The annotated low resolution image is used as a template for microdissection.

In some embodiments, a first sample is scanned at a high resolution and then digitally processed to obtain data for a low resolution copy of an image of the first sample. In some embodiments, a first sample is scanned at a high resolution and a low resolution to obtain high resolution and low resolution image data. In some embodiments, an image of the first sample from the low resolution image data copy or the acquired low resolution image data is displayed on a monitor of a viewing terminal. In some embodiments, an area of the image of the first sample displayed on the monitor of the viewing terminal is selected, wherein selection of said area prompts the transfer of corresponding high resolution image data of the area to the viewing terminal for display on a monitor. In some embodiments, a user views the image of the first sample displayed on the monitor of the viewing terminal and annotates the area of interest for microdissection on the low resolution image copy or the acquired low resolution image, the high resolution image, or both; and wherein the annotation is stored on a database and retrieved on a portable computer. Digital processing includes digital image compression and/or the removal of peripheral shading around an image. An exemplary view of an annotated high resolution image of a sample is shown in FIG. 4A, with a corresponding low resolution annotated image shown in FIG. 4B.

In one aspect, provided herein is a method for acquiring, processing, and displaying an image of a first sample of a specimen, wherein the displayed imaged is used as a template for processing a second sample of the specimen. Processing the second sample includes dissection. In exemplary embodiments, the method comprises (a) preparing two samples of a specimen, a stained sample and an unstained sample, (b) providing the stained sample to an image acquisition system, (c) acquiring one or more high resolution or low resolution images of the sample using the image acquisition system, (d) if more than one image is acquired, optionally reassembling the acquired images to a single image, (e) if the one or more images are high resolution images, processing high resolution image data to obtain a low resolution copy of the image data, (f) displaying the low resolution image data on a display to generate a navigation map, (g) annotating the low resolution image to select an area for dissection, (h) displaying the annotated image on a portable computer attached to a microdissection device, wherein the microdissection device comprises the unstained sample, (i) overlaying the unstained sample with the annotated image of the stained sample, and (j) dissecting the unstained sample using the annotated image of the stained sample as a guide. The method optionally further comprises processing the dissected sample using PCR. In some embodiments, the sample provided to the image acquisition system is not stained.

In some embodiments, the sample is provided to the image acquisition system on a slide. In some embodiments, the system comprises a slide holder configured for holding said slide. In some embodiments, the slide holder is motorized, and its movements are optionally controlled using a software program.

In some embodiments, an imaging device of the acquisition system acquires the one or more images of the sample. In some embodiments, the one or more images of the sample, either alone or in combination, capture the entire sample provided to the system. In some embodiments, the single image comprises the entire sample provided to the system. In some embodiments, acquiring an image comprises illuminating the sample with a light source. In some embodiments, acquiring an image comprises collecting and concentrating light from the light source and transmitting the concentrated light to/through the sample by use of a condenser. In some embodiments, acquiring an image comprises acquiring light transmitted through the sample and projecting the light onto an acquisition device by means of an optical microscope objective. An acquisition device includes, without limitation, a digital camera. In some embodiments, an imaging device scans/acquires one or more images of a sample and the one or more images are saved. In some embodiments, an imaging device scans/acquires one or more images of a sample and the one or more images are displayed live (e.g., using software and a display). In some embodiments, an imaging device scans/acquires one or more images of a sample and the one or more images are both saved and displayed. A portion or all of the scanned/acquired images may be saved and/or displayed, wherein the display may or may not be live.

In one aspect, step (c) of the latter method comprises acquiring the one or more images at high resolution, in a single or multiple scans. A single scan may include the acquisition of multiple successive images of the sample, wherein the scan covers the entire sample or a desired area of the sample. In an additional embodiment, the method comprises the use of a software program to process the high resolution images to a low resolution image copy. In some instances, this low resolution copy is a single image of the entire sample or a desired area of the sample. In an additional embodiment, both high and low resolution image data is saved to a storage means.

In one aspect, the latter method comprises transferring image data to a viewing terminal. Image data includes, without limitation, acquired images, processed images, a reassembled single image, high resolution image data, low resolution image data and processed low resolution copy image data. A viewing terminal may be a remote terminal. In many implementations, the viewing terminal comprises a computer. The viewing terminal comprises one or more displays for viewing acquired and/or processed images and image data. In some embodiments, the viewing terminal comprises a display of a low resolution copy of a sample image as a navigation map. The image is displayed using a software program. The software program enables a user to select an area of the low resolution copy of the image, thereby annotating the image. In some embodiments, the selection area is suitable for dissection. In some embodiments, the annotated image is displayed on a screen of a portable computer.

In some embodiments, a method for acquiring an image of a sample for use in a microdissection method described herein comprises viewing a live display of the sample. In exemplary embodiments, the method comprises capturing and saving an image of the sample. In additional embodiments, the method comprises simultaneously displaying a live and a saved image of a sample, wherein the two displays are synchronized by a fiducial. In one example, the method comprises (a) providing a sample to be imaged to an image acquisition device, (b) acquiring one or more images of the sample using the imaging device, wherein the imaging device comprises a fiducial and an X and Y axis for defining sample positions relative to the fiducial, (c) if more than one image is acquired, optionally reassembling the acquired images to a single image, (d) displaying a first image on a first display, wherein the first image is an acquired image or a reassembled single image, (e) referencing an X and Y position of the first image relative to the fiducial, (f) displaying a second image of the sample on a second display, wherein the second image is a live image, and (g) referencing an X and Y position of the second image relative to the fiducial, wherein referencing the X and Y position of the first and second images relative to the fiducial allows for the first and second displays to have a synchronized view of the sample. In some embodiments, the method further comprises adjusting magnification of the second image, allowing for differential magnifications of the sample to be displayed on the first and second displays simultaneously. In some embodiments, the method father comprises saving acquired images. In some embodiments, the method further comprises saving the single (reassembled) image. In some embodiments, the sample is provided to the system on a slide. In some embodiments, the system comprises a stage configured for holding said slide. In some embodiments, the stage is motorized, and its movements are optionally controlled using a software program.

In some embodiments, an imaging device acquires the one or more images of the sample. In some embodiments, the one or more images of the sample, either alone or in combination, capture the entire sample provided to the system. In some embodiments, the single image comprises the entire sample provided to the system. In some embodiments, acquiring an image comprises illuminating the sample with a light source. In some embodiments, acquiring an image comprises collecting and concentrating light from the light source and transmitting the concentrated light to/through the sample by use of a condenser. In some embodiments, acquiring an image comprises acquiring light transmitted through the sample and projecting the light onto a sensing device by means of an optical microscope objective. A sensing device includes, without limitation, a CCD or linear array. In some embodiments, an imaging device scans/acquires one or more images of a sample and the one or more images are saved. In some embodiments, an imaging device scans/acquires one or more images of a sample and the one or more images are displayed live (e.g., using software and a display). In some embodiments, an imaging device scans/acquires one or more images of a sample and the one or more images are both saved and displayed. A portion or all of the scanned/acquired images may be saved and/or displayed, wherein the display may or may not be live.

In one aspect, step (b) of the method above comprises acquiring the one or more images at high resolution, in a single or multiple scans. A single scan may include the acquisition of multiple successive images of the sample, wherein the scan covers the entire sample or a desired area of the sample. In an additional embodiment, the method comprises the use of a software program to process the high resolution images to a low resolution image copy. In some instances, this low resolution copy is a single image of the entire sample or a desired area of the sample. In an additional embodiment, both high and low resolution image data is saved to a storage means. In some cases, this data is saved with corresponding X and Y coordinate information, imaging device information, sample information, image annotations, any addition sample and/or device information, or a combination thereof. In one aspect, the method comprises transferring image data to a viewing terminal. Image data includes, without limitation, acquired images, processed images, a reassembled single image, high resolution image data, low resolution image data, and image coordinate address. A viewing terminal may be a remote terminal. In many implementations, the viewing terminal comprises a computer. The viewing terminal comprises one or more displays for viewing acquired and/or processed images and image data. In some embodiments, the viewing terminal comprises a display of a low resolution copy of a sample image. In exemplary embodiments, the viewing terminal further comprises a second display of a live image of the sample. The image is displayed using a software program. The software program enables a user to select an area of the low resolution copy of the image, wherein the selection area has a X and Y coordinate. A live view of the corresponding selection area is then displayed on a second display, wherein the second display displays a high resolution image of the sample selection area. Thus, the methods allow for a synchronized, simultaneous display of low and high resolution images of a sample.

In some embodiments, a software program configured to live viewing synchronizes the X and Y axes positions based on a fiducial point. In some embodiments, the software comprises a confirmation step feature which prompts a user to select the same object on both images, wherein both images indicate the image displayed on the first display as well as the image displayed on the second display, to center and synchronize the X and Y axis on the live system to the current view of a stored image. In this example, wherever the user moves the view of the stored image, the imaging device moves the live image along the X and Y axes to the same location. In additional embodiments, when certain zoom thresholds are made on the viewing of the stored image, the live image will change microscope objectives to match within a range.

Portable Computer

In one aspect, provided herein are methods and systems for specimen microdissection that utilize a portable computer to display an image of the specimen. A portable computer includes any mobile processing device comprising a screen configured to display an image of a specimen. A portable computer includes, without limitation, laptop computers, notebook computers, sub-notebook computers, netbook computers, netpad computers, media streaming devices, handheld computers, mobile smartphones, tablet computers, and personal digital assistants. In some embodiments, the screen of a portable device comprises one or more sensors that identify touch. In some preferred embodiments, a portable computer is a tablet computer. Tablet computers include, without limitation, Samsung Galaxy Tab® Tablets, Nook Tablets, Kindle Fire® Tablets, Nexus Tablets, and iPad® Tablets.

Digital Processing Device

In some embodiments, the methods, systems, media, and devices described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art. In some cases wherein a digital processing device comprises a screen, a digital processing device is a portable computer. Non-limiting examples of digital processing devices with screens include laptop computers, notebook computers, sub-notebook computers, netbook computers, netpad computers, media streaming devices, handheld computers, mobile smartphones, tablet computers, and personal digital assistants. In some preferred embodiments, a tablet computer is a digital processing device useful as a portable computer for the methods and systems described herein.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the methods, systems, media, and devices disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the methods, systems, media, and devices disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the methods, systems, media, and devices disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, media, and devices disclosed herein include one or more databases, or use of the same. In view of the disclosure provided herein, those of skill in the art will recognize that many databases are suitable for storage and retrieval of specimen, user, location, positioning, focus, magnification, and presentation information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

The following illustrative examples are representative of embodiments of the devices, applications, systems, and methods described herein and are not meant to be limiting in any way.

EXAMPLES

Example 1

Microdissection Device

A microdissection device comprises a frame and a receiving region as a single component. The device is comprised of a rigid plastic that attaches to distal ends of an iPad® via attachment wings located at each end of the device. The receiving region comprises an opening flanked by a plastic rim. The opening is 1.03 inches by 3.03 inches. The plastic rim is recessed within the frame and is configured to hold a slide of 1 inch by 3 inches, with a tolerance of ±0.03 inches.

Example 2

Microdissection

Two samples of a specimen are prepared, one stained and one unstained. The stained sample is scanned and uploaded to an image server. The server hosts a web viewer which displays the image for viewing and annotation. The image consists of at least one scanned image that may be tiled, allowing the image to be zoomed and panned to display a magnified view of each area of the sample scanned. To optimize time and speed, the image is optionally displayed in tiled pyramidal files format, allowing for high and low resolution image viewing. A pathologist views the image of the sample and locates an area suitable for microdissection. The area is selected by drawing a circle around the area using a mouse. The annotated image is then saved and sent back to the server to be hosted to a tablet computer. The annotated image is displayed on the tablet at a size equivalent to the original unstained sample. The tablet has a sleeve comprising a slide holder having the unstained sample. The sleeve slides over the tablet, allowing a user to align the unstained slide with the annotated image of the stained slide. An exemplary sleeve and tablet is shown in FIG. 1. The user then uses the annotated image as a guide to dissect the unstained sample. The dissected unstained sample is further processed using PCR.

Example 3

Method of Displaying an Image of a Sample for Microdissection

Acquiring image data for use in hybridized telemicroscopy: A slide comprising a cytology specimen sample is positioned on a motorized stage of an imaging device. The imaging device comprises a microscope having a high power 40× objective lens. The imaging device is operably connected to a network comprising an acquisition computer. Software on the acquisition computer is utilized to direct a single scan of the entire sample performed at 40× magnification and high resolution to provide a discernable image of every portion of the sample. The image data is processed using said software and saved to a database. The image data is stored according to an identification code (e.g., barcode) assigned to the sample.

Telemicroscropy: The stored image data is accessed from a second computer at a remote terminal, wherein the remote terminal is part of the network, and wherein the second computer comprises a software program. A low resolution copy of the image data is displayed on a monitor. A user at the remote terminal selects an area of the low resolution image, prompting the software to transfer a corresponding high resolution image of the selection area to the remote terminal. The low resolution copy is utilized as a map to move the sample on an X and Y axes live by clicking on the low resolution copy. A second display of a high resolution copy is then displayed on the same monitor of the terminal. The user zooms and pans around the selection area to analyze. The user annotates areas of the sample for dissection.

Microdissection: A processor of a portable computer receives the low resolution image data and the annotation data and displays the annotated image on a screen of the portable computer. A technician attaches to the portable computer a microdissection device, for example, as described in Example 1. The technician affixes a sample of the cytology specimen corresponding to the cytology specimen imaged to a slide and positions the slide onto the receiving region of the microdissection device. The device is moved so that the sample on the slide overlays the annotated image. The technician dissects the sample on the slide using the annotated image as a template.

What is claimed is:

1. A microdissection method comprising:
   a) providing to an imaging device comprising a microscope a first sample of a specimen comprising an area of interest for microdissection;
   b) acquiring image data using the imaging device from a scan of the first sample, wherein the scan of the first sample is obtained at a high resolution using a digital acquisition device;
   c) digitally processing the image data at the high resolution to obtain a low resolution copy of the image data, or acquiring low resolution image data of the first sample from the scan of the first sample at the low resolution, and displaying an image of the first sample from the low resolution copy or the acquired low resolution image data on a monitor of a viewing terminal;
   d) storing the image data from the scan in a database;
   e) retrieving on a portable computer stored image data from the area of interest of the first sample, wherein the retrieved image data is presented on a screen of the portable computer as a display image;
   f) placing a second sample of the specimen comprising the area of interest for microdissection on a sleeve positioned over the screen of the portable computer;
   g) overlaying the area of interest for microdissection of the second sample with the display image of the first sample; and
   h) dissecting the area of interest of the second sample using the display image of the first area of interest of the first sample as a template.

2. The method of claim 1, wherein the first sample of the specimen is stained with a dye and the second sample of the specimen is not stained with a dye.

3. The method of claim 1, wherein acquiring image data from the scan of the first sample comprises advancing a field of view of an objective lens of the imaging device stepwise across the first sample while acquiring successive images of each field of view.

4. The method of claim 1, comprising transferring the image data from the scan to a viewing terminal for display to a user on a monitor, wherein the user views the display of the image data and defines the area of interest for microdissection with an annotation.

5. The method of claim 4, wherein the annotation is stored with the image data on the database, and wherein the stored annotation is retrieved with the image data by the portable computer.

6. The method of claim 1, comprising selecting of an area of the image of the first sample displayed on the monitor of the viewing terminal, wherein selection of said area prompts transfer of corresponding high resolution image data of the area to the viewing terminal for display on the monitor.

7. The method of claim 1, wherein a user views the image of the first sample displayed on the monitor of the viewing terminal and annotates the area of interest for microdissection on the low resolution image copy or the acquired low resolution image, the high resolution image, or both; and wherein the annotation is stored on the database and retrieved on the portable computer.

8. The method of claim 1, wherein the digital acquisition device comprises a camera, a CCD, a linear array, or combinations thereof.

* * * * *